US006453469B1

(12) United States Patent
Jystad

(10) Patent No.: US 6,453,469 B1
(45) Date of Patent: Sep. 17, 2002

(54) METHOD AND APPARATUS TO AUTOMATICALLY DEINSTALL AN APPLICATION MODULE WHEN NOT FUNCTIONING

(75) Inventor: Glenn E. Jystad, Dove Canyon, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,254

(22) Filed: Jun. 18, 1999

(51) Int. Cl.[7] .............................................. G06F 9/455
(52) U.S. Cl. ........................ 717/174; 717/168; 717/177
(58) Field of Search ............................. 717/3, 11, 120, 717/168, 169, 170, 174; 703/23; 707/8, 202, 203

(56) References Cited

U.S. PATENT DOCUMENTS

| | | | |
|---|---|---|---|
| 5,121,345 A | 6/1992 | Lentz ........................... 713/188 |
| 5,128,995 A | 7/1992 | Arnold et al. .................. 713/1 |
| 5,131,089 A | 7/1992 | Cole ............................ 703/24 |
| 5,142,680 A | 8/1992 | Ottman et al. ................. 717/76 |
| 5,146,568 A | 9/1992 | Flaherty et al. ................ 703/24 |
| 5,214,695 A | 5/1993 | Arnold et al. .................. 713/2 |
| 5,274,816 A | 12/1993 | Oka ............................. 713/2 |
| 5,280,627 A | 1/1994 | Flaherty et al. ................. 713/2 |
| 5,307,497 A | 4/1994 | Feigenbaum et al. ........... 713/1 |
| 5,325,532 A | 6/1994 | Crosswy et al. ................ 713/2 |
| 5,379,431 A | 1/1995 | Lemon et al. ................. 710/10 |
| 5,381,549 A | 1/1995 | Tamura .......................... 713/1 |
| 5,418,918 A | 5/1995 | Vander Kamp et al. ......... 713/2 |
| 5,444,850 A | 8/1995 | Chang ......................... 709/222 |
| 5,448,741 A | 9/1995 | Oka .............................. 713/2 |
| 5,452,454 A | 9/1995 | Basu ............................. 713/2 |
| 5,463,766 A | 10/1995 | Schieve et al. ................. 713/2 |
| 5,469,573 A | 11/1995 | McGill, III et al. .......... 717/127 |
| 5,504,905 A | 4/1996 | Cleary et al. ................ 713/100 |
| 5,522,076 A | 5/1996 | Dewa ............................ 713/2 |
| 5,526,523 A | 6/1996 | Straub et al. ................ 713/100 |
| 5,542,082 A | 7/1996 | Solhjell ...................... 711/115 |
| 5,581,740 A | 12/1996 | Jones ........................... 703/25 |
| 5,586,327 A | 12/1996 | Bealkowski et al. ........... 713/2 |
| 5,594,903 A | 1/1997 | Bunnell et al. .............. 717/162 |
| 5,604,890 A | 2/1997 | Miller ......................... 703/23 |
| 5,652,868 A | 7/1997 | Williams ...................... 703/23 |
| 5,652,886 A | 7/1997 | Tulpule et al. ................. 713/2 |
| 5,664,194 A | 9/1997 | Paulsen ....................... 717/178 |
| 5,680,547 A | 10/1997 | Chang ......................... 709/222 |
| 5,684,996 A | * 11/1997 | Westerholm et al. ......... 717/168 |
| 5,692,190 A | 11/1997 | Williams ....................... 713/2 |

(List continued on next page.)

OTHER PUBLICATIONS

Carey et al, "Microcomputer acess to cross software system" ACM pp 84–91, Sep. 1980.*
Han et al, "Secure multicast software delivery", IEEE, pp 207–212, Sep. 2000.*
Green, "What you installed is what you see help navigation in modular software products", IEEE, pp 521–533, Jul. 2000.*
Orimo et al, "Autonomous decentralized system supporting for fault tolerance and on line maintenance of communication software", IEEE, pp 1536–1540, Feb. 1995.*

Primary Examiner—Anil Khatri

(57) ABSTRACT

A method and apparatus for automatically installing a target application module and de-installing the target application module if it fails to execute or function properly is described. In one embodiment, the method includes determining whether a shared resource exists on a target media, and, if the shared resource exists, determining whether the application module functioned properly on the target media, and automatically de-installing the application module if the application module failed to function properly.

20 Claims, 8 Drawing Sheets

U.S. PATENT DOCUMENTS

| | | | |
|---|---|---|---|
| 5,694,583 A | 12/1997 | Williams et al. | 703/24 |
| 5,694,600 A | 12/1997 | Khenson et al. | 713/2 |
| 5,696,975 A * | 12/1997 | Moore et al. | 717/168 |
| 5,701,477 A | 12/1997 | Chejlava, Jr. | 713/2 |
| 5,715,456 A | 2/1998 | Bennett et al. | 713/2 |
| 5,717,930 A | 2/1998 | Imai et al. | 717/176 |
| 5,727,213 A | 3/1998 | Vander Kamp et al. | 713/2 |
| 5,732,268 A | 3/1998 | Bizzarri | 713/2 |
| 5,742,829 A * | 4/1998 | Davis et al. | 717/178 |
| 5,745,568 A * | 4/1998 | O'Connor et al. | 705/56 |
| 5,748,957 A | 5/1998 | Klein | 713/2 |
| 5,754,853 A | 5/1998 | Pearce | 713/2 |
| 5,758,154 A * | 5/1998 | Qureshi | 713/1 |
| 5,764,593 A | 6/1998 | Turpin et al. | 713/2 |
| 5,781,758 A | 7/1998 | Morley | 703/23 |
| 5,790,849 A | 8/1998 | Crocker et al. | 713/2 |
| 5,796,984 A | 8/1998 | Pearce et al. | 381/71.8 |
| 5,802,363 A | 9/1998 | Williams et al. | 713/2 |
| 5,805,880 A | 9/1998 | Pearce et al. | 713/2 |
| 5,805,882 A | 9/1998 | Cooper et al. | 713/2 |
| 5,815,706 A | 9/1998 | Stewart et al. | 713/2 |
| 5,819,063 A | 10/1998 | Dahl et al. | 703/27 |
| 5,828,888 A | 10/1998 | Kozaki et al. | 717/107 |
| 5,832,251 A | 11/1998 | Takahashi | 703/23 |
| 5,842,011 A | 11/1998 | Basu | 713/2 |
| 5,854,905 A | 12/1998 | Garney | 710/104 |
| 5,859,969 A * | 1/1999 | Oki et al. | 709/200 |
| 5,864,698 A | 1/1999 | Krau et al. | 713/2 |
| 5,887,164 A | 3/1999 | Gupta | 713/2 |
| 5,901,310 A | 5/1999 | Rahman et al. | 713/1 |
| 5,907,679 A | 5/1999 | Hoang et al. | 709/203 |
| 5,933,646 A * | 8/1999 | Hendrickson et al. | 717/11 |
| 5,960,206 A * | 9/1999 | Barsness et al. | 717/174 |
| 5,966,540 A * | 10/1999 | Lister et al. | 717/174 |
| 5,978,590 A * | 11/1999 | Imai et al. | 717/177 |
| 6,073,123 A * | 6/2000 | Staley | 705/58 |
| 6,151,643 A * | 11/2000 | Cheng et al. | 710/36 |
| 6,167,567 A * | 12/2000 | Chiles et al. | 717/11 |
| 6,189,147 B1 * | 2/2001 | Davis | 717/11 |
| 6,253,374 B1 * | 6/2001 | Dresevic et al. | 717/11 |
| 6,269,480 B1 * | 7/2001 | Curtis | 717/106 |
| 6,279,154 B1 * | 8/2001 | Davis | 717/106 |
| 6,279,156 B1 * | 8/2001 | Amberg et al. | 717/124 |
| 6,282,712 B1 * | 8/2001 | Davis et al. | 717/170 |
| 6,308,326 B1 * | 10/2001 | Murphy et al. | 717/174 |

* cited by examiner

US 6,453,469 B1

METHOD AND APPARATUS TO AUTOMATICALLY DEINSTALL AN APPLICATION MODULE WHEN NOT FUNCTIONING

BACKGROUND OF THE INVENTION

1. Field of the Invention

The present invention relates generally to the field of computer systems, and specifically, to automatic de-installation of a target application module if the application module does not function properly.

2. Background Information

There are a number of mechanisms for installing a target application program using an installation program, where the installation program itself is an application. The installation application is responsible for taking necessary components of the target application and placing it on a target media, and making modifications to the operating system, if necessary, to allow the target application to execute properly. These mechanisms include using an executable program or a batch file. Typically, the installation of the application programs is user initiated. If there is a problem, the user is asked to de-install the application program if it fails to run properly.

However, if the application program is installed automatically without the knowledge and consent of the user, the application program can cause the system to lock up if the application program fails to run properly or is otherwise rendered inoperable.

SUMMARY OF THE INVENTION

The present invention comprises a method of automatically de-installing an application module on a target media. In one embodiment, the method includes determining whether a shared resource exists on a target media, and, if the shared resource exists, determining whether the application module functioned properly on the target media, and automatically de-installing the application module if the application module failed to function properly.

Other embodiments are described and claimed herein.

DETAILED DESCRIPTION

Figure 1:
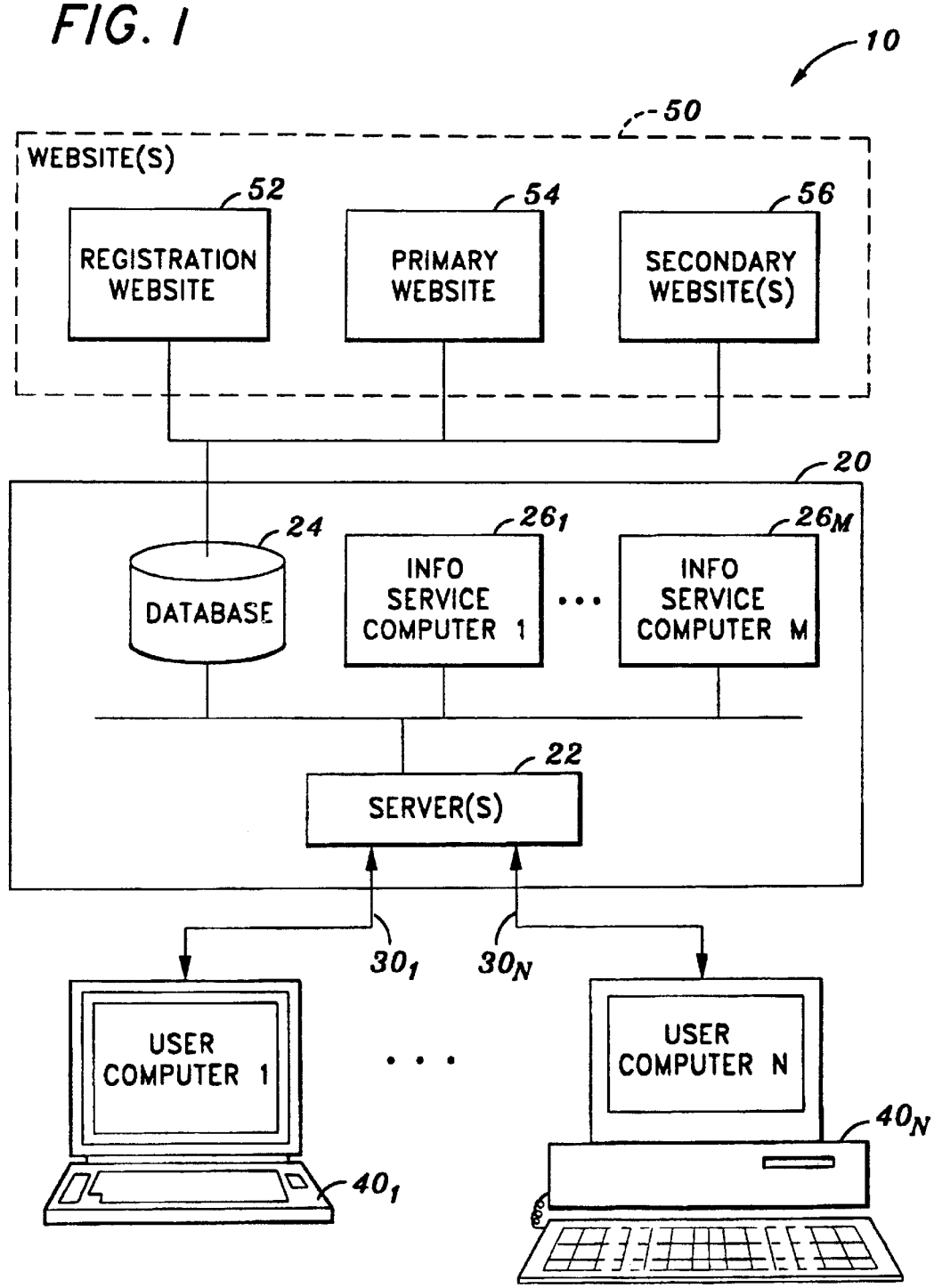
FIG. 1 is a system block diagram of one embodiment of an information distribution system in which the apparatus and method of the invention is used.

The present invention comprises a method and apparatus for automatically de-installing a target application module if it fails to function or function properly. In one embodiment, when a computer system is initially powered on, a source application module searches for a shares resource on non-volatile memory, and if not found, creates the shares resource and initializes first and second flags in the shared resource. Prior to or after creating the shared resource, the source application module automatically installs the target application module on a target media. The target application module, once started, resets the first flag. If the target application module functions properly, the target application module resets the second flag. The criterion(ria) for determining whether the target application module is functioning properly depends on a number of factors and may vary accordingly.

When the source application module is started during a subsequent power-on self-test (POST) of the computer system, the source application module again searches for the shares resource, and if present, first interrogates the second flag. If the second flag is greater than (or equal to) a second predetermined count, indicating that the target application module has consecutively failed to function properly for the second predetermined count, the source application module automatically de-installs or disables the target application module. The source application module may optionally set a third flag in the shared resource to prevent re-installation of the target application module.

If the second flag is not greater than the second predetermined count, then the source application module interrogates the first flag. If the first flag is greater than (or equal to) a first predetermined count, indicating that the target application module has consecutively failed to start properly for the first predetermined count, the source application module automatically re-installs the target application module. However, if the first flag is not greater than the first predetermined count, then the source application module increments the first and second flags and ends, indicating that the target application module functioned properly. In one embodiment, this process is repeated indefinitely during subsequent POSTs.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications. Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, messages with graphics or informational material, animation, Joint Photographic Experts Group (JPEG)/ Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289 entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
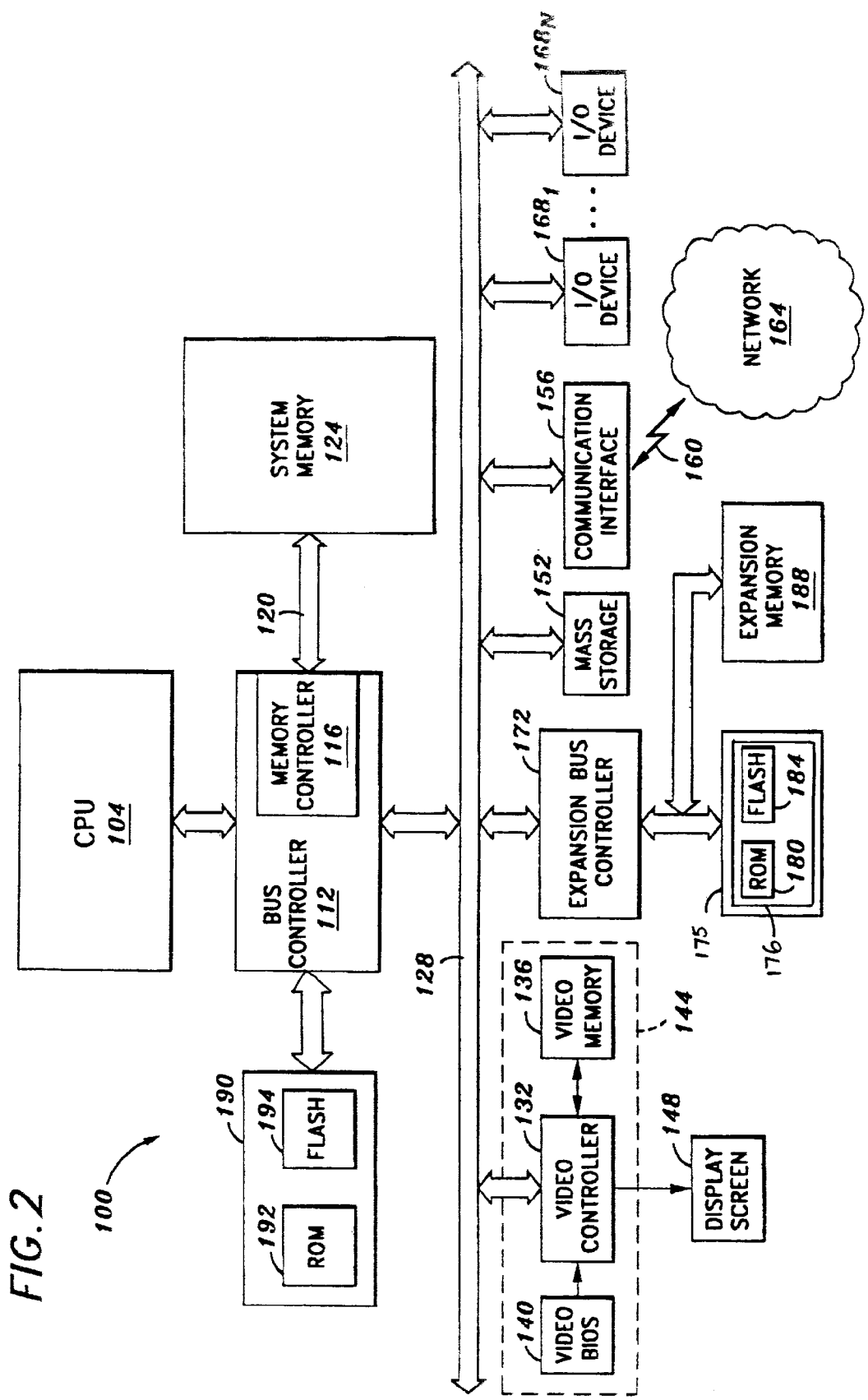
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680x0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$ and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175 which includes system firmware 176. The system firmware 176 includes system BIOS (numeral 82, FIG. 3), which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
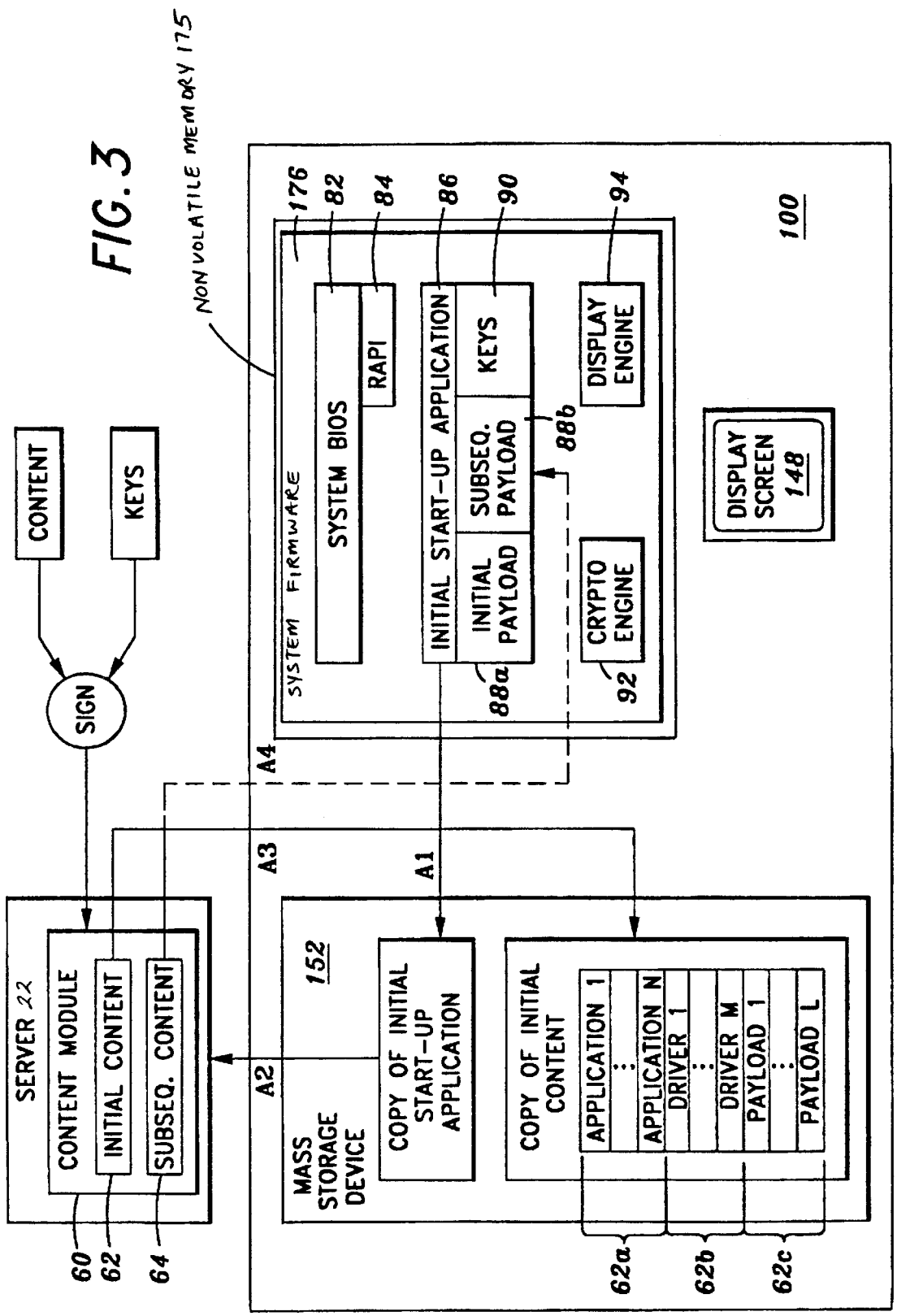
FIG. 3 illustrates a logical diagram of one embodiment of the invention.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd. One embodiment of RAPI 84 is described in copending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 "Method and Apparatus for Automatically Installing and Configuring Software on a Computer," filed on Jun. 18, 1999, assigned to Phoenix Technologies, Ltd., and which is incorporated herein by reference.

Figure 4A:
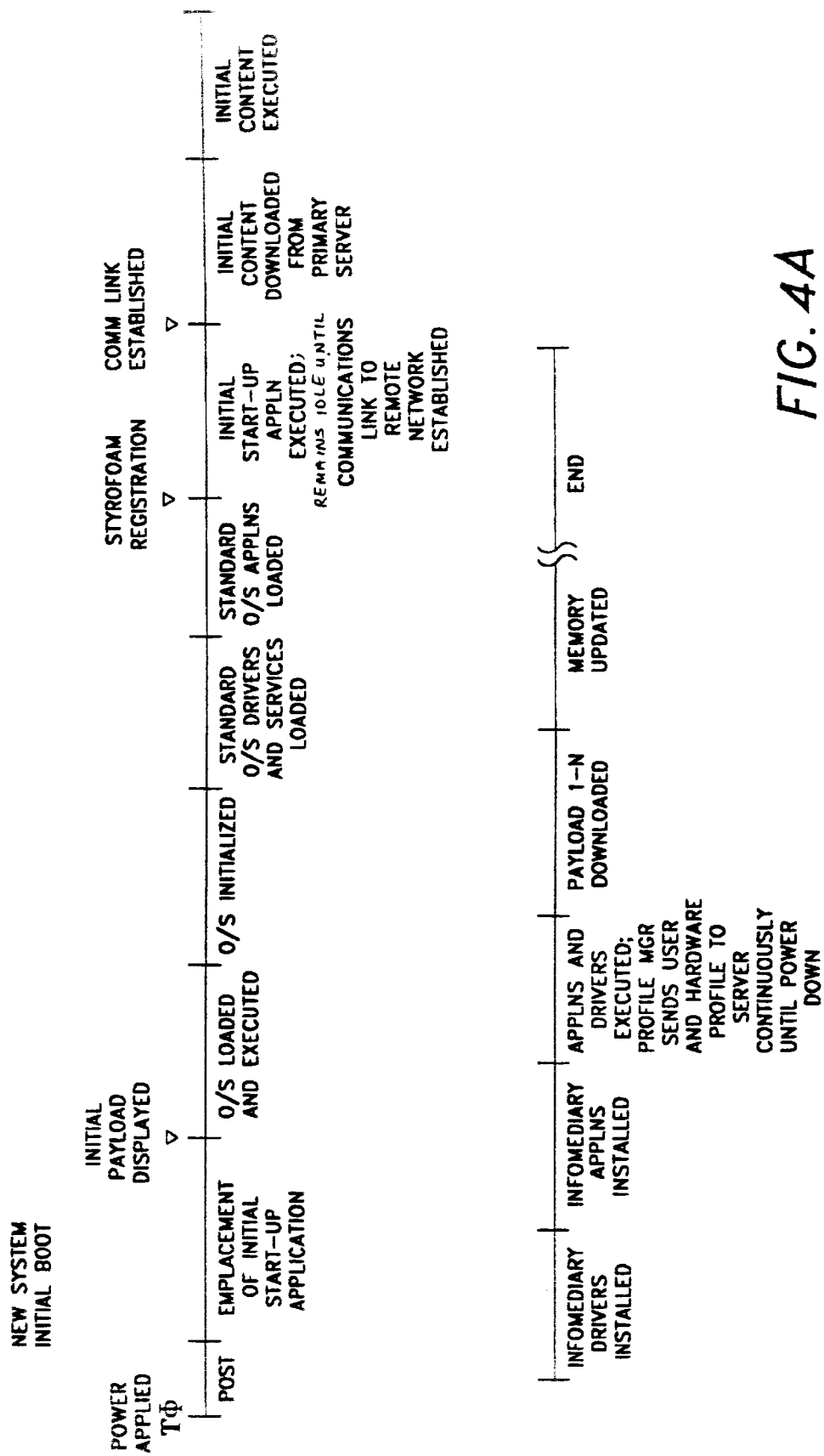
FIGS. 4A and 4B illustrate an embodiment of a process flow chart provided in accordance with the principles of the invention.
Figure 4B:
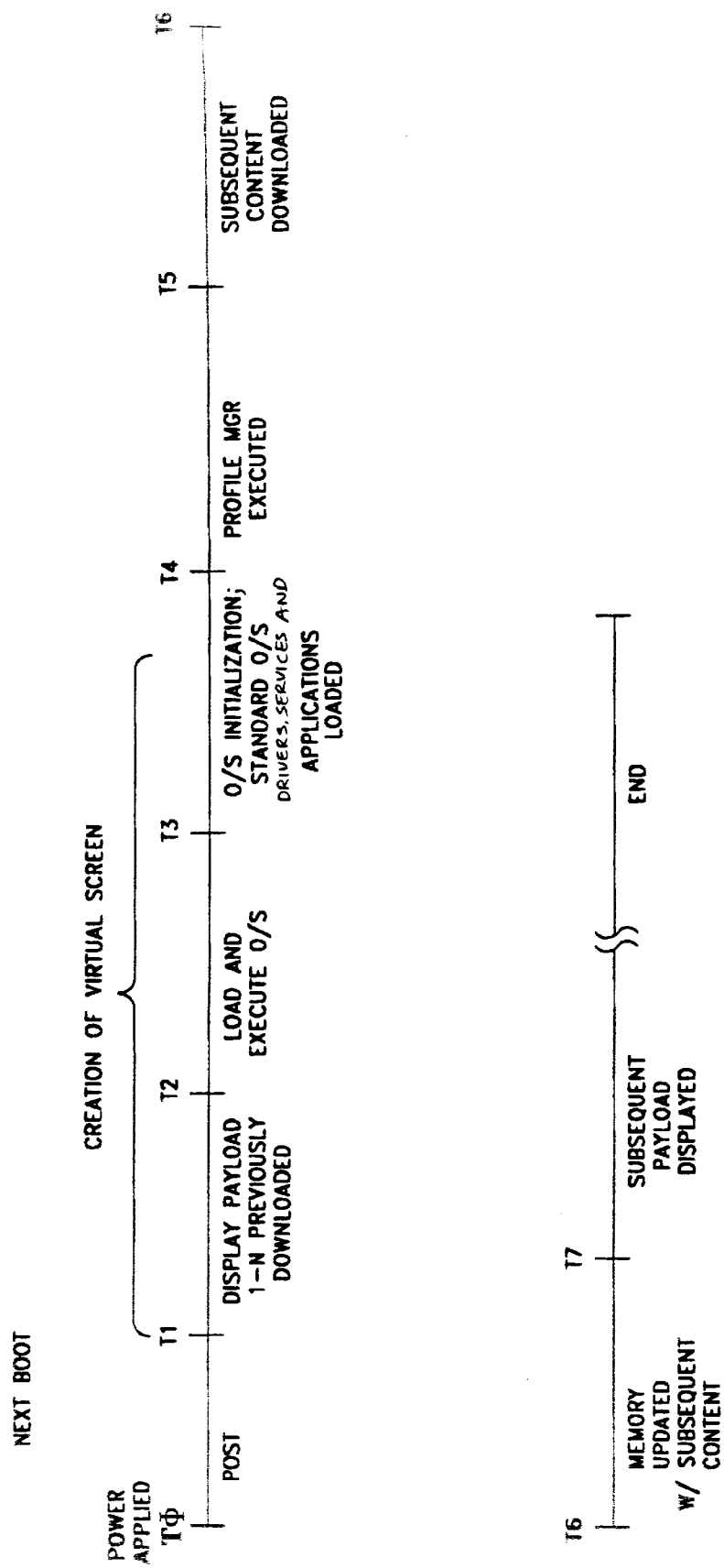

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067 entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending Continuation-in-Part U.S. patent application Ser. No. 09/336,307 entitled "Method and Apparatus for Providing Memory-Based Device Emulation" filed on Jun. 18, 1999, and in co-pending U.S. patent application Ser. No. 09/336,281 entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62*a,* drivers 62*b,* and payloads 62*c.* In one embodiment, the applications 62*a* include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88*b.* In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. NO. 09/336,003 entitled "Displaying Images during Boot-up and Shut-down" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages with graphics or informational material. In a further embodiment, the messages with graphics or informational material may again be displayed during the shut-down process, for example, replacing the screen display that displays the message "Windows is shutting down" or "It is now safe to turn off your computer" with other selected content.

Figure 5:
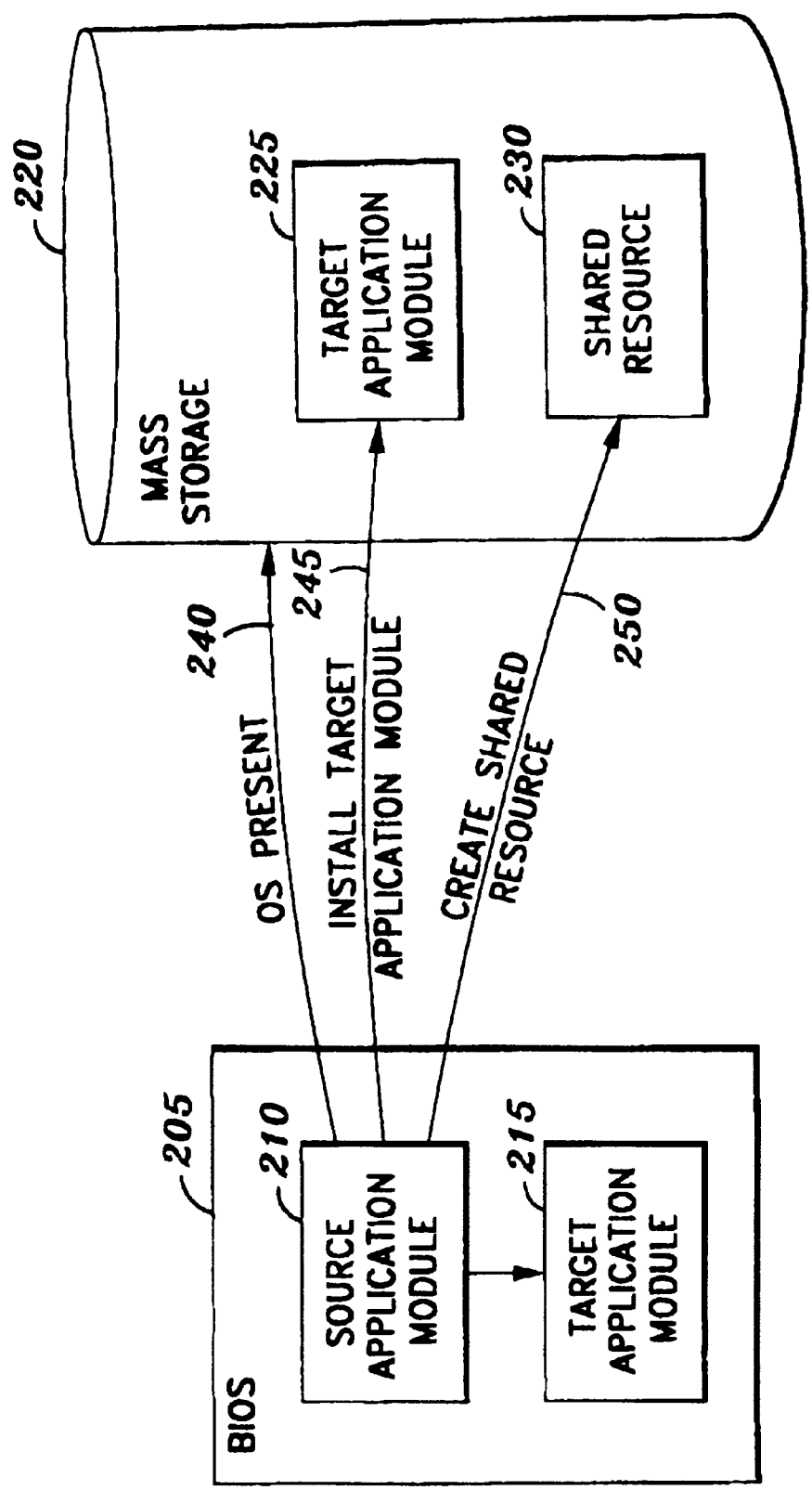
FIG. 5 shows a logical diagram of a BIOS and non-volatile storage according to an embodiment of the present invention.

FIG. 5 shows a logical diagram of a BIOS 205 and non-volatile storage 220, according to an embodiment of the present invention. Referring to FIG. 5, the logical diagram shows BIOS 205 which may be implemented as one single device or a plurality of devices. The BIOS 205 includes, among other modules, a source application module 210 and a target application module 215. In one embodiment, the source and target modules 210 and 215 are installed during creation of BIOS 205. At least a portion of the BIOS 205 has electrically alterable non-volatile memory such as EEPROM or flash memory. Thus, in another embodiment, the target module 215 is programmed into BIOS 205 after the BIOS 205 is created and installed. In one embodiment, the target application module 215 is the ISAU 86 shown in FIG. 3. In an alternative embodiment, the target application module 215 is also the data loader application after it replaces the ISAU 86. The source application module 210 is executed at some point during BIOS POST. In one embodiment, the source application module 210 is located in system BIOS 82 (FIG. 3).

Also shown in FIG. 5 is non-volatile memory 220, which may take many forms. In one embodiment, the non-volatile memory 220 includes, but is not limited or restricted to, a mass storage device (e.g., hard disk), an optical device, etc., or combinations thereof (e.g., mass storage 152 of FIG. 2). It must be noted that the source and target application modules 210 and 215 may be stored on the nonvolatile memory 220 rather than BIOS 205.

Referring to FIGS. 2 and 5, when the computer system 100 is initially turned on, the source application module 210 determines whether there is an operating system present, as shown by arrow 240. Stated another way, the source module 210 checks to see whether all conditions are satisfied in order for it to install the target application module 215. In one embodiment, the source application module determines that an operating system is present by detecting the presence of (i) a partition on the target media (e.g., hard disk), (ii) an understood file system structures (e.g., FAT Table) on the target media, (iii) a target operating system in the file system structure, and/or (iv) necessary files used in the target application.

Once it determines that an operating system is present, the source application module 210 checks to see if a shared resource 230 is present at a predetermined location on the target media (e.g., mass storage 220). If the shared resource 230 is not present, the source application module 210 creates the shared resource 230, as shown by arrow 250, and installs (arrow 245) the target application module 215 onto the target media (e.g., mass storage 220), shown by numeral 225. The shared resource 230 may be a file or memory location on non-volatile memory 220 having flags or variables that are shared by both the source application module 210 and the target application module 225. Alternatively, the shared resource 230 may be located on an electrically alterable portion of the BIOS 205 (e.g., EEPROM, flash, etc.). It is to be appreciated that the shared resource 230 may be created before, at the same time, or after the installation of the target application module 225.

The target application module 225, once installed on the target media, becomes an executable program that runs on computer system 100. In one embodiment, the target application module 225 is executed in the background every time the computer system 100 is started and the operating system loaded. In this embodiment, the target application module 225 may be the ISAU 86 (FIG. 3). Alternatively, the target application module 225 may also be the data loader application that is downloaded onto computer system 100 by the ISAU 86, and which replaces the ISAU 86. As discussed above, the ISAU 86 runs in the background and remains idle until an Internet connection (or other network connection) is detected. Thus, the ISAU 86 periodically polls (e.g., every 15 seconds) to see if an Internet connection is present.

In one embodiment, the criterion(ria) for determining whether the target application module 225 is functioning properly includes (i) polling to see if there is an Internet connection X times (e.g., 5 times), (ii) detecting that there is an Internet connection, and/or (iii) successfully downloading the data loader application. If the target application module 225 is or becomes the data loader application, then the criterion(ria) for determining whether the target application module 225 is functioning may be different. A function of the data loader application includes, but not limited or restricted to, downloading content from a remote computer (e.g., web site). It must be noted that the target application module 225 may perform any other function, and thus the criterion(ria) for determining whether the target application module 225 is functioning properly may therefore vary. However, embodiments of the present invention provide a mechanism that automatically installs a target application module, automatically de-installs the target application module if it fails to function properly, and/or automatically re-installs the target application module in certain condition, irrespective of what the target application module is or under what condition(s) the target application module is deemed to function properly.

If the target application module 225 fails to execute, then a first flag, which is created in the shared resource, is not reset, causing the source application module, the next time it is executed, to detect the failure of the target application module to execute or run properly. The failure to execute may be due to a number of factors including, among other things, failure in the transfer of the target application module, failure in the target media, or failure of the functionality of the operating system servicing the target application module. If the target application module fails to execute consecutively a first predetermined number of times, then the source application module performs automatic re-installation of the target application module on the target media. Alternatively, the source application module performs automatic installation of the target application module on an alternate media.

If the target application module executes but fails to function properly, then a second flag, which is created in the shared resource, is not reset, allowing the source application module, the next time it is executed, to detect the failure of the target application module to function properly. If the target application module fails to function properly consecutively a second predetermined number of times, then the source application module performs automatic de-installation of the target application module from the target media. Following a successful de-installation, the source application module optionally establishes another flag to ensure that no further attempts to automatically install the target application module are made. Alternatively, the user is allowed to reset this flag or the flag is reset after a predetermined time period has passed, allowing the source application module to again attempt to re-install the target application module.

Once the criterion(ria) has been satisfied by the target application module 225, the first and second flags are reset to indicate to the source application module 210, the next time it is executed, that the target application module 225 executed and functioned properly.

The source application module 210 also watches the status of the shared resource and/or the target application module 225 in the case of a non-error condition to contemplate re-installation. For example, after the target application module 225 is installed on a hard disk, if the hard disk is removed or erased, or a new operating system or system files are installed altering the character of the target application module 225 and/or the shared resource 230, the source application module 210 detects that the target application module 225 and/or the shared resource 230 is not present and re-installs them.

Figure 6:
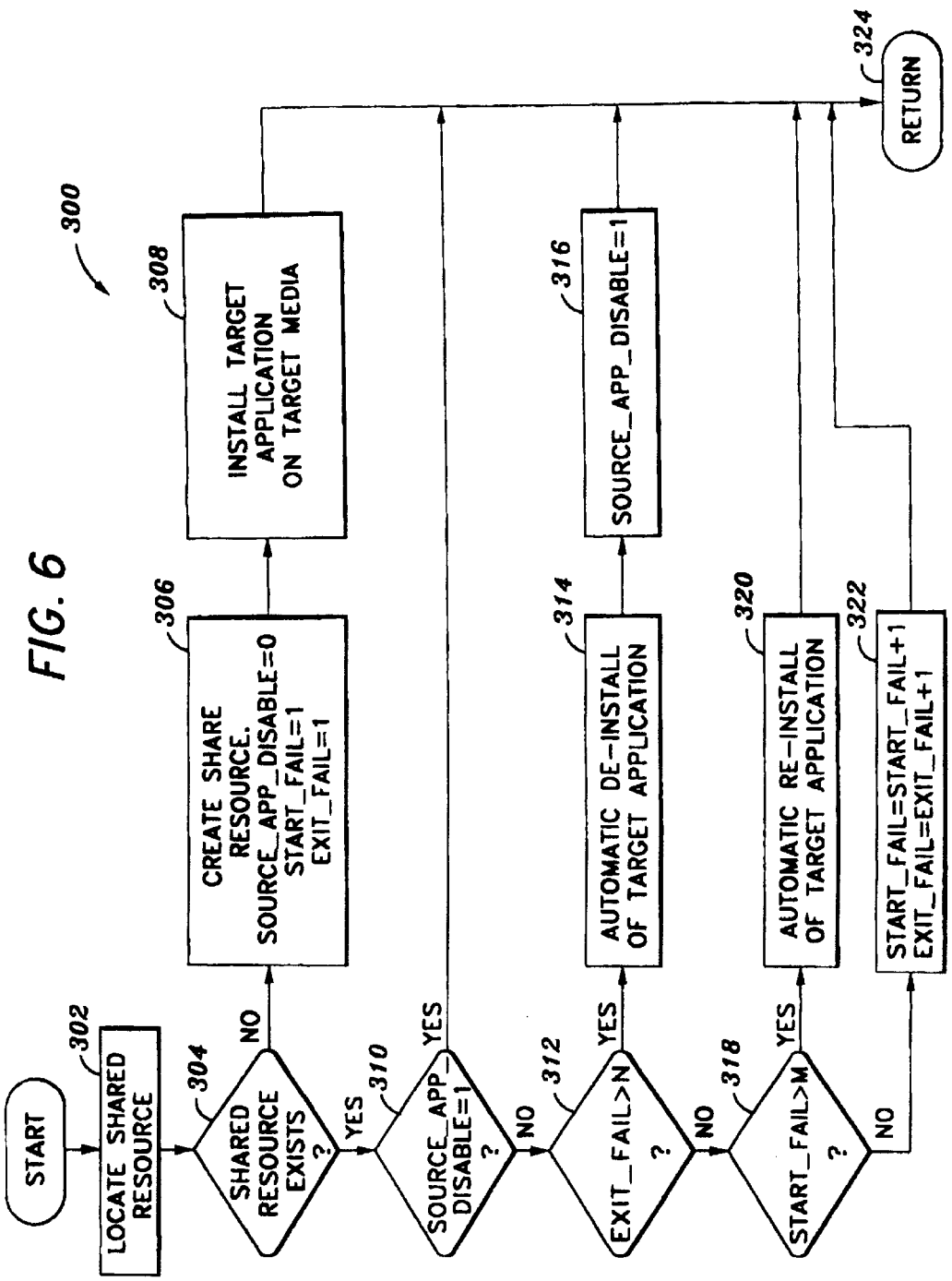
FIG. 6 is a flow diagram illustrating the operations performed by the source application module, according to one embodiment of the present invention.

FIG. 6 is a flow diagram illustrating the operations performed by the source application module 300, according to one embodiment of the present invention. The source application module 300 is launched at some point during BIOS POST. Referring to FIG. 6, the source application module 300 commences at block 302 where the source application module 300 searches for the shared resource at a predetermined location on the target media (e.g., non-volatile memory such as mass storage or flash). At block 304, if the shared resource file does not exists, the source application module 300 creates and stores the shared resource at the predetermined location on the target media (block 306). The source application module 300 then creates and initializes a number of flags in the shared resource file. In particular, SOURCE_APP_DISABLE is set to zero, and START_FAIL and EXIT_FAIL are each set to one. Then, at block 308, the target application module is installed on the target media. In one embodiment, the steps for installing and/or re-installing the target application module include (i) determining whether a partition table exists, (ii) finding the active partition and whether its type is supported, (iii) interrogating the file allocation table and directory structures to determine whether a successfully installed operating system is present, (iv) interrogating the operating system initialization files, etc. After determining that the operating system is installed, the source application module manipulates the file system structures to create additional file entries in a target subdirectory. After creating the file entries, the source application module decompresses and copies the target application module and its associated files onto the target subdirectory. Once the target application module is installed, the source application module 300 ends (block 324). Note that blocks 306 and 308 are performed, among other times, during the initial execution of the source application module 300, in the event the target media is removed or erased, or in the event the shared resource file is erased.

On the other hand, at block 304, if the shared resource file exists, indicating that the target application module is installed, the source application module 300, at block 310, interrogates SOURCE_APP_DISABLE. If SOURCE_APP_DISABLE is equal to one, then the source application module 300 ends. If SOURCE_APP_DISABLE is not equal to one, then the source application module 300 interrogates EXIT_FAIL, at block 312. If EXIT_FAIL is greater than N, where N is a positive whole number (e.g., 6), indicating that the target application module has failed to function properly N consecutive times, then the source application module 300 automatically de-installs or disables the target application module (block 314), modifies SOURCE_APP_DISABLE to one (block 316), and ends. However, in one embodiment, to prevent premature de-installation of the target application module, N is set at 2 or greater. De-installing the target application module under all circumstances may be draconian and inflexible in light of the possible failure causes. For example, the cause of the possible error condition or failure may be due to a user improperly shutting the computer off even though the target application program would have operated successfully.

If EXIT_FAIL is not greater than N, then the source application module 300 interrogates START_FAIL (block 318). If START_FAIL is greater than M, where M is a positive whole number (e.g., 4), indicating that the target application module has failed to start properly M consecutive times, then the source application module 300 automatically re-installs the target application module (block 320) and ends. The target application module may fail to start properly if it has been erased, corrupted, is incompatible with operating system files, etc. If START_FAIL is not greater than M, then the source application module 300 increments both EXIT_FAIL and START_FAIL (block 322), which are located in the shared resource.

Figure 7:
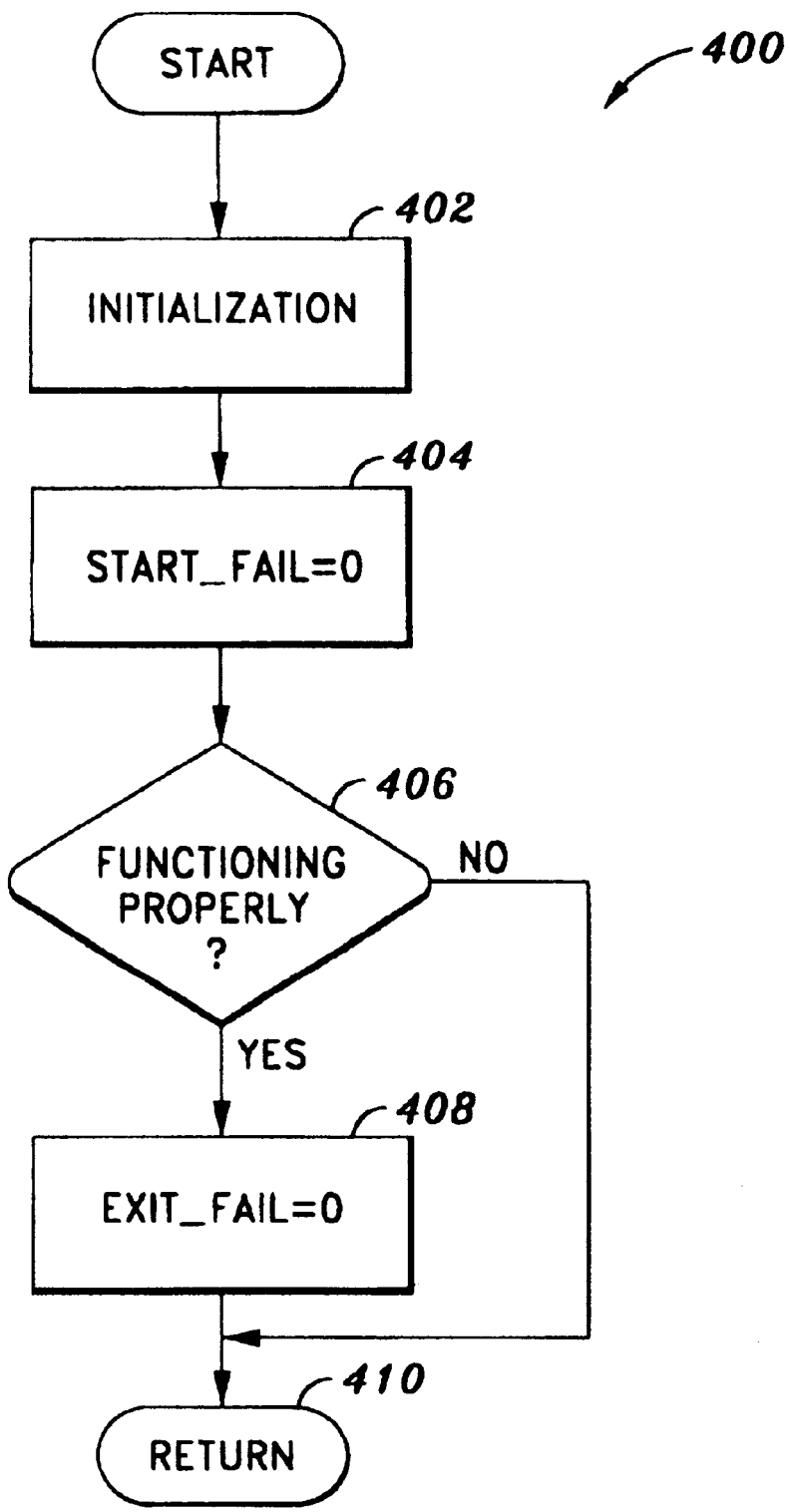
FIG. 7 is a flow diagram illustrating the operations performed by the target application module when installed on the target media, according to an exemplary embodiment of the present invention.

FIG. 7 is a flow diagram illustrating the operations performed by the target application module 400 when installed on the target media, according to an exemplary embodiment of the present invention. Referring to FIG. 7, the target application module 400 commences at block 402 where initialization is performed such as initializing parameters, verifying that the operating system files are present, that the target application module files are present, etc. If block 402 is successfully executed, then START_FAIL is reset to zero, at block 404, indicating that the target application module 400 is able to execute. At block 406, a determination is made as to whether the target application module 400 is function properly. The criterion(ria) for determining whether the target application module 400 is functioning properly varies from one application to another, however, exemplary criteria are provided above, in accordance to one embodiment. If the target application module 400 is functioning properly, then EXIT_FAIL is reset to zero (block 408) and the target application module 400 ends at block 410. If the target application module 400 is not functioning properly, then it ends at block 410 without resetting EXIT_FAIL to zero.

The present invention provides a source application module which monitors the functionality of a target application module and automatically de-installing the same in the case of failure. This provides advantages including detection of a failure caused by numerous non-deterministic scenarios, automatic de-installation of the target application module without requiring user knowledge or intervention, self-detection of non-deterministic scenario to prevent automatic installation, and deinstallation of the target application module without the use of the operating system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of automatically de-installing an application module on a target media, comprising:

determining whether a shared resource exists on the target media, said shared resource to be updated when the application module functions properly; and if the shared resource exists, determining whether the application module functioned properly on the target media by interrogating the shared resource, and automatically de-installing the application module if the application module failed to function properly.

2. The method of claim 1 wherein if the shared resource does not exists, creating the shared resource; and automatically installing the application module on the target media.

3. The method of claim 1 wherein determining whether the application module functioned properly on the target media comprises interrogating a flag located in the shared resource.

4. The method of claim 1 wherein automatically de-installing the application module comprises automatically de-installing the application module if the application module failed to function properly a predetermined number of times.

5. The method of claim 1 wherein if the shared resource exists, the method further comprising:

determining whether the application module executed on the target media by interrogating the shared resource, automatically re-installing the application module if the application module failed to execute on the target media.

6. The method of claim 1 wherein the target media comprises mass storage.

7. The method of claim 1 wherein the shared resource is created on one of the following: flash and mass storage.

8. The computer program product of claim 7 further comprising computer readable program code to create the shared resource and automatically install the application module on the target media, if the shared resource does not exists.

9. The method of claim 1 wherein said shared resource is a flag which is reset when the application module functions properly and incremented when the application module does not function properly, and wherein said automatically de-installing the application program comprises automatically de-installing the application program when said flag is at least equal to a predetermined value.

10. A computer program product, comprising:

a computer usable medium having computer program code embodied therein to determine whether a shared resource exists on a target media, said shared resource to be updated when the application module functions properly; and computer readable program code to determine whether the application module functioned properly on the target media by interrogating the shared resource, and to automatically de-install the application module if the application module failed to function properly, if the shared resource exists.

11. The computer program product of claim 10 wherein the computer readable program code to determine whether the application module functioned properly comprises computer readable program code to interrogate a flag located in the shared resource.

12. The computer program product of claim 10 wherein the computer readable program code to automatically de-install the application module comprises computer readable program code to automatically de-install the application module if the application module failed to function properly a predetermined number of times.

13. The computer program product of claim 10 further comprising computer readable program code to determine whether the application module executed on the target media and automatically re-install the application module if the application module failed to execute on the target media.

14. The computer program product of claim 10 wherein the target media comprises mass storage.

15. The computer program product of claim 10 wherein the shared resource is created on one of the following: flash and mass storage.

16. A computer system, comprising:

a memory element having one or more instructions;

a processor coupled to the memory element, the processor, in response to the one or more instructions, to, determine whether a shared resource exists on a first media, said shared resource to be updated when a target application program functions properly, and if the shared resource does not exist, install the target application program on a second media, and if the shared resource does exist, determine whether the target application functioned properly during its last operation on the first media, and automatically de-install the target application if the target application failed to function properly.

17. The computer system of claim 16 wherein the memory element is one of the following: a read only memory and a random access memory.

18. The computer system of claim 16 wherein the first media is a hard disk.

19. The computer system of claim 16 wherein the second media is flash memory.

20. The computer system of claim 16 wherein the processor, in response to the one or more instructions to further automatically de-install the target application if the target application failed to function properly N consecutive time, where N is a positive whole number greater than one.

* * * * *